US011465889B2

United States Patent
Murthy et al.

(10) Patent No.: US 11,465,889 B2
(45) Date of Patent: *Oct. 11, 2022

(54) HOIST SYSTEM WITH HOUSEHOLD OBJECT PAYLOAD MOTION CONTROL UTILIZING AMBIENT DEPTH DATA

(71) Applicant: Bumblebee Spaces Inc., San Francisco, CA (US)

(72) Inventors: Sankarshan Narasimha Murthy, Mountain View, CA (US); Garrett Rayner, Mountain View, CA (US); Prahlad Athreya, San Ramon, CA (US); Aaron Licata, San Ramon, CA (US); Deepthi Krovvidi, Mountain View, CA (US); Scott Tandoi, San Francisco, CA (US); Terrence Williams, Mountain View, CA (US)

(73) Assignee: Bumblebee Spaces Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,538

(22) Filed: Oct. 5, 2020

(65) Prior Publication Data

US 2021/0017005 A1    Jan. 21, 2021

Related U.S. Application Data

(63) Continuation of application No. 16/256,469, filed on Jan. 24, 2019, now Pat. No. 10,793,404.

(Continued)

(51) Int. Cl.
*B66D 1/40* (2006.01)
*B66D 1/48* (2006.01)
(Continued)

(52) U.S. Cl.
CPC .............. *B66D 1/485* (2013.01); *A47C 17/84* (2013.01); *B66D 1/12* (2013.01); *B66D 1/38* (2013.01);
(Continued)

(58) Field of Classification Search
CPC ... B66D 1/12; B66D 1/24; B66D 1/46; B66D 1/485; B66D 1/56; B66D 1/58;
(Continued)

(56) References Cited

U.S. PATENT DOCUMENTS 5,871,070 A * 2/1999 Contreras ................ B66D 1/04
187/263
6,507,962 B2 * 1/2003 Thurston ................ A47C 17/84
5/10.1

(Continued)

FOREIGN PATENT DOCUMENTS

JP       2013175049 A  *  9/2013

*Primary Examiner* — Emmanuel M Marcelo
(74) *Attorney, Agent, or Firm* — Fenwick & West LLP

(57) ABSTRACT

A system has a hoist system to lift a payload to a position adjacent to a ceiling of a room Image sensor systems collect visual data and payload depth data within the payload and ambient depth data within the room. A controller is connected to the hoist system and the image sensor systems. The controller is configured to control the motion of the hoist system. The motion of the hoist system is controlled in part by the ambient depth data from the room.

18 Claims, 11 Drawing Sheets

Related U.S. Application Data

(60) Provisional application No. 62/622,579, filed on Jan. 26, 2018.

(51) Int. Cl.

| | | |
|---|---|---|
| *B66D 1/12* | (2006.01) | |
| *B66D 1/58* | (2006.01) | |
| *G06T 7/50* | (2017.01) | |
| *B66D 1/38* | (2006.01) | |
| *A47C 17/84* | (2006.01) | |

(52) U.S. Cl.
CPC .................. *B66D 1/58* (2013.01); *G06T 7/50* (2017.01); *B66D 2700/025* (2013.01)

(58) Field of Classification Search
CPC ....... B66D 1/7426; G06T 7/50; A47B 97/001; A47C 17/84
See application file for complete search history.

(56) References Cited

U.S. PATENT DOCUMENTS

| | | | | |
|---|---|---|---|---|
| 7,150,449 B1* | 12/2006 | Dueck | .................. | B62H 3/12 |
| | | | | 254/278 |
| 7,243,870 B2* | 7/2007 | Pook | .................. | A63J 1/028 |
| | | | | 242/278 |
| 7,325,785 B2* | 2/2008 | Krengel | .................. | A47B 5/00 |
| | | | | 211/17 |
| 7,533,869 B2* | 5/2009 | Boda | .................. | B62H 3/12 |
| | | | | 254/352 |
| 7,963,505 B2* | 6/2011 | Taylor | .................. | B66D 1/26 |
| | | | | 254/286 |
| 8,544,823 B2* | 10/2013 | Imberi | .................. | B66D 1/12 |
| | | | | 254/338 |
| 8,613,428 B2* | 12/2013 | Hoffend, III | .................. | B66D 1/74 |
| | | | | 254/374 |
| 9,260,279 B2* | 2/2016 | Hoffend, III | .................. | B66D 1/12 |
| 9,460,524 B1* | 10/2016 | Curlander | .................. | G01F 22/00 |
| 9,690,990 B2* | 6/2017 | Chiu | .................. | G06K 9/00671 |
| 9,737,140 B2* | 8/2017 | Bondi | .................. | A47B 43/006 |
| 9,909,713 B1* | 3/2018 | Brockie | .................. | B66D 3/04 |
| 9,940,730 B2* | 4/2018 | Zhang | .................. | G06T 7/62 |
| 10,094,131 B1* | 10/2018 | Garcia, III | .................. | E04H 6/424 |
| 10,657,666 B2* | 5/2020 | Trajkovic | .................. | G06T 7/194 |
| 2003/0176986 A1* | 9/2003 | Dietsch | .................. | G01C 15/002 |
| | | | | 702/150 |
| 2004/0238804 A1* | 12/2004 | Revi | .................. | B65G 67/20 |
| | | | | 254/278 |
| 2007/0029267 A1* | 2/2007 | Hall | .................. | B62H 3/12 |
| | | | | 211/17 |
| 2007/0176524 A1* | 8/2007 | Plano | .................. | A47B 77/04 |
| | | | | 312/247 |
| 2008/0025565 A1* | 1/2008 | Zhang | .................. | G06K 9/3241 |
| | | | | 382/103 |
| 2010/0073476 A1* | 3/2010 | Liang | .................. | G06Q 10/08 |
| | | | | 348/136 |
| 2013/0342653 A1* | 12/2013 | McCloskey | .................. | H04N 13/204 |
| | | | | 348/46 |
| 2014/0132707 A1* | 5/2014 | Hashimoto | .................. | G06T 7/593 |
| | | | | 348/36 |
| 2015/0144768 A1* | 5/2015 | Lee | .................. | G06F 1/3259 |
| | | | | 250/208.1 |
| 2015/0284224 A1* | 10/2015 | Hall | .................. | B66D 1/58 |
| | | | | 254/333 |
| 2015/0284226 A1* | 10/2015 | Hall | .................. | B66C 13/46 |
| | | | | 414/21 |
| 2017/0163937 A1* | 6/2017 | McNelley | .................. | G09G 3/3208 |
| 2018/0252921 A1* | 9/2018 | Rantala | .................. | G02B 27/017 |
| 2018/0284735 A1* | 10/2018 | Cella | .................. | G06N 3/0445 |
| 2018/0344115 A1* | 12/2018 | Shin | .................. | A47L 11/4011 |
| 2019/0174207 A1* | 6/2019 | Cella | .................. | H04L 67/12 |
| 2020/0133254 A1* | 4/2020 | Cella | .................. | G06N 5/046 |

\* cited by examiner

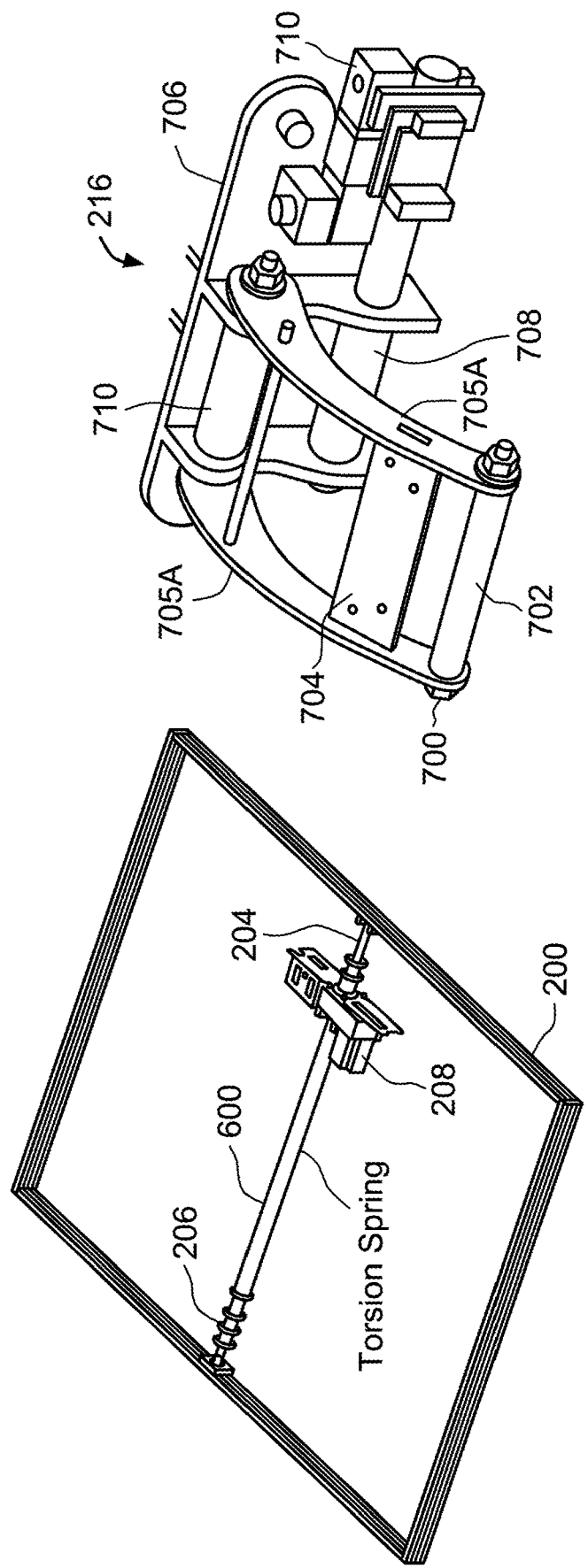

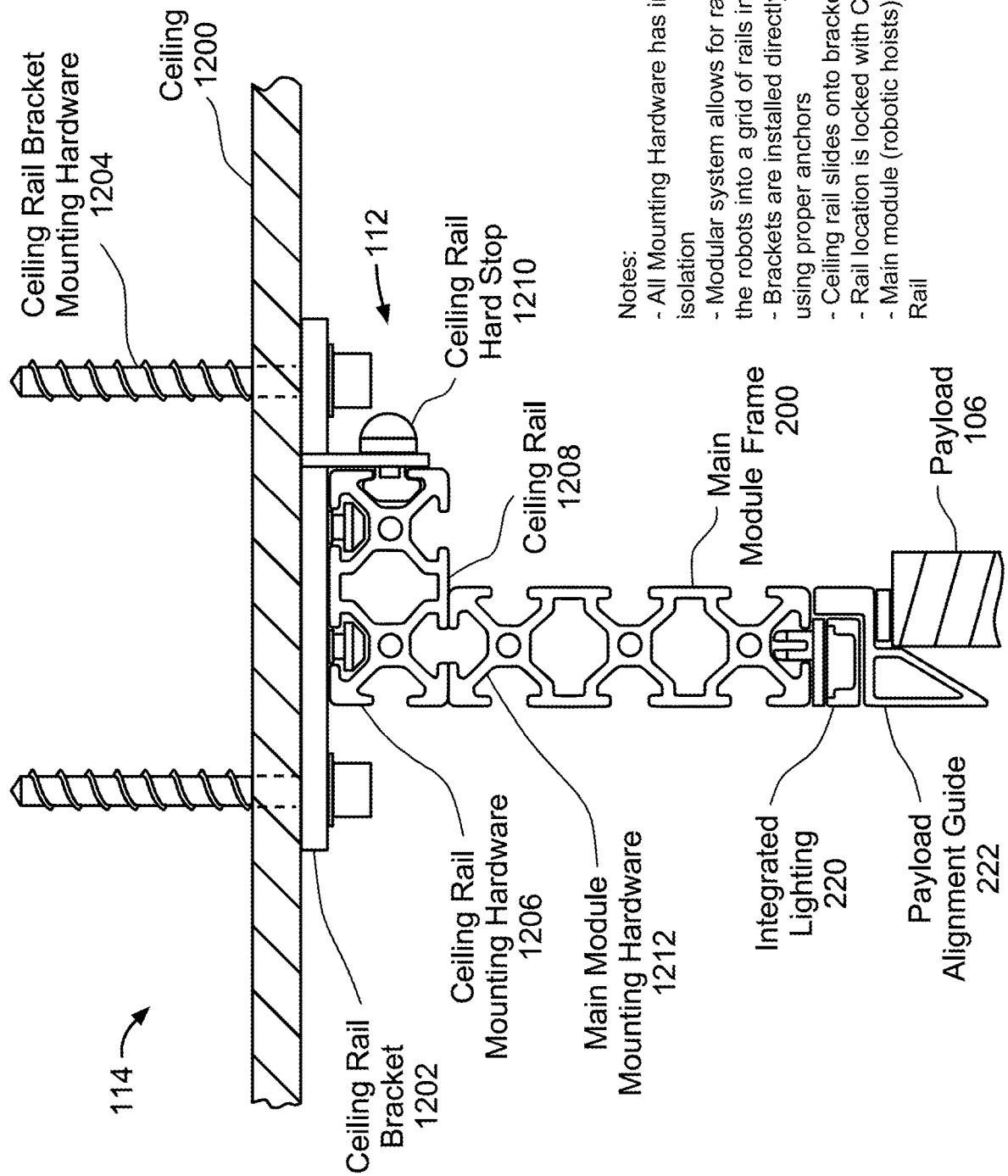

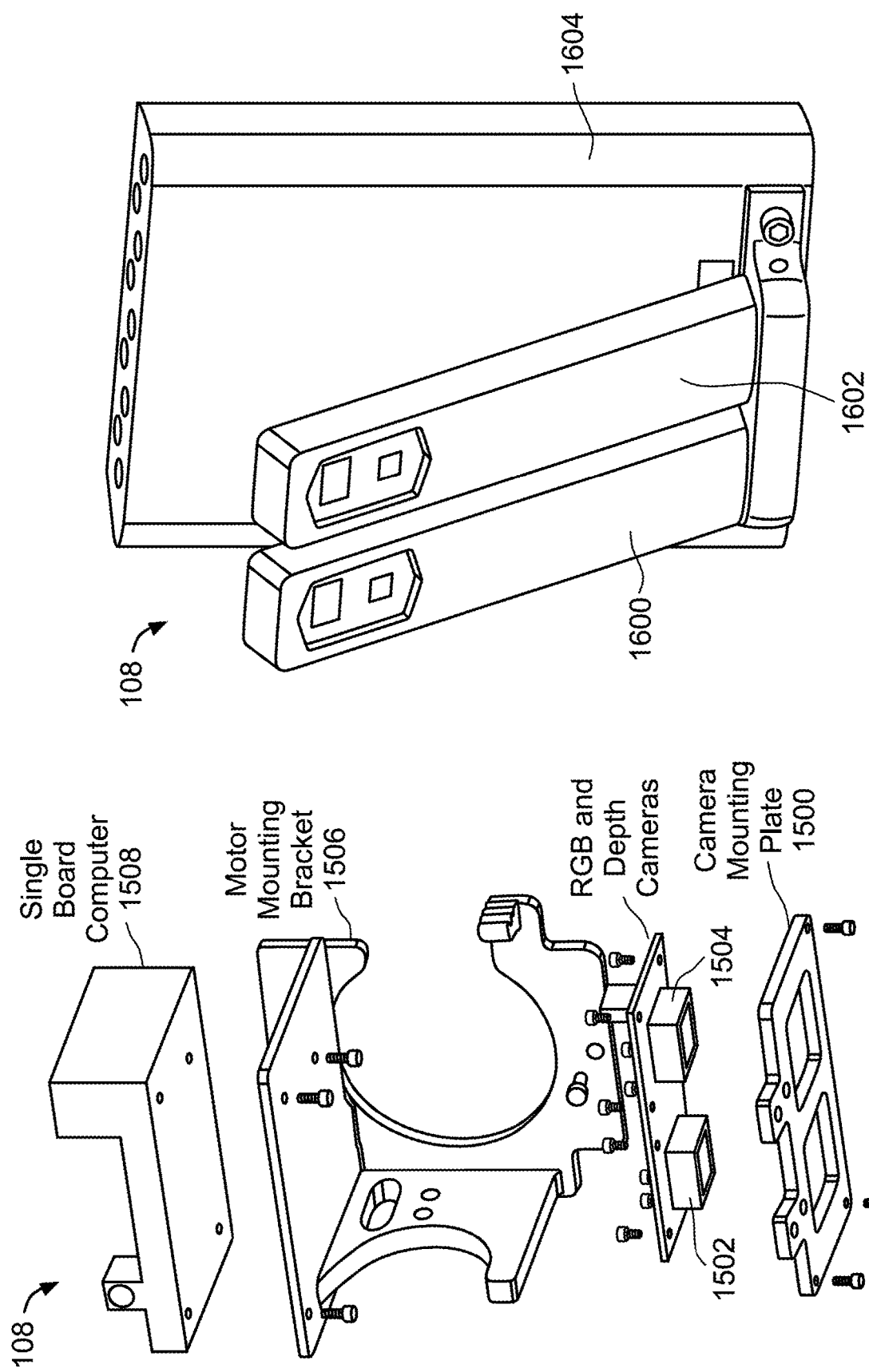

HOIST SYSTEM WITH HOUSEHOLD OBJECT PAYLOAD MOTION CONTROL UTILIZING AMBIENT DEPTH DATA

CROSS-REFERENCE TO RELATED APPLICATIONS

This application is a continuation of U.S. patent application Ser. No. 16/256,469, filed Jan. 24, 2019, which claims priority to U.S. Provisional Patent Application Ser. No. 62/622,579, filed Jan. 26, 2018. The aforementioned disclosures are hereby incorporated by reference in their entireties including all references.

FIELD OF THE INVENTION

This application relates generally to robotic control of household object payloads. More particularly, this invention is directed toward a hoist system with household object payload motion control utilizing ambient depth data.

BACKGROUND OF THE INVENTION

The demand for housing with efficient utilization of space is growing, particularly in urban areas. Accordingly, there is a need for more efficient utilization of space in such housing.

SUMMARY OF THE INVENTION

A system has a hoist system to lift a payload to a position adjacent to a ceiling of a room Image sensor systems collect visual data and payload depth data within the payload and ambient depth data within the room. A controller is connected to the hoist system and the image sensor systems. The controller is configured to control the motion of the hoist system. The motion of the hoist system is controlled in part by the ambient depth data from the room.

BRIEF DESCRIPTION OF THE FIGURES

The invention is more fully appreciated in connection with the following detailed description taken in conjunction with the accompanying drawings, in which:

FIG. 6 illustrates a hoist frame, shaft and torsion spring utilized in accordance with an embodiment of the invention.

FIG. 7 illustrates a webbing guide utilized in accordance with an embodiment of the invention.

FIG. 12 illustrates a ceiling mount and a hoist system mounting utilized in accordance with an embodiment of the invention.

FIGS. 15 and 16 illustrate image sensor systems utilized in accordance with embodiments of the invention.

Like reference numerals refer to corresponding parts throughout the several views of the drawings.

DETAILED DESCRIPTION OF THE INVENTION

Figure 1:
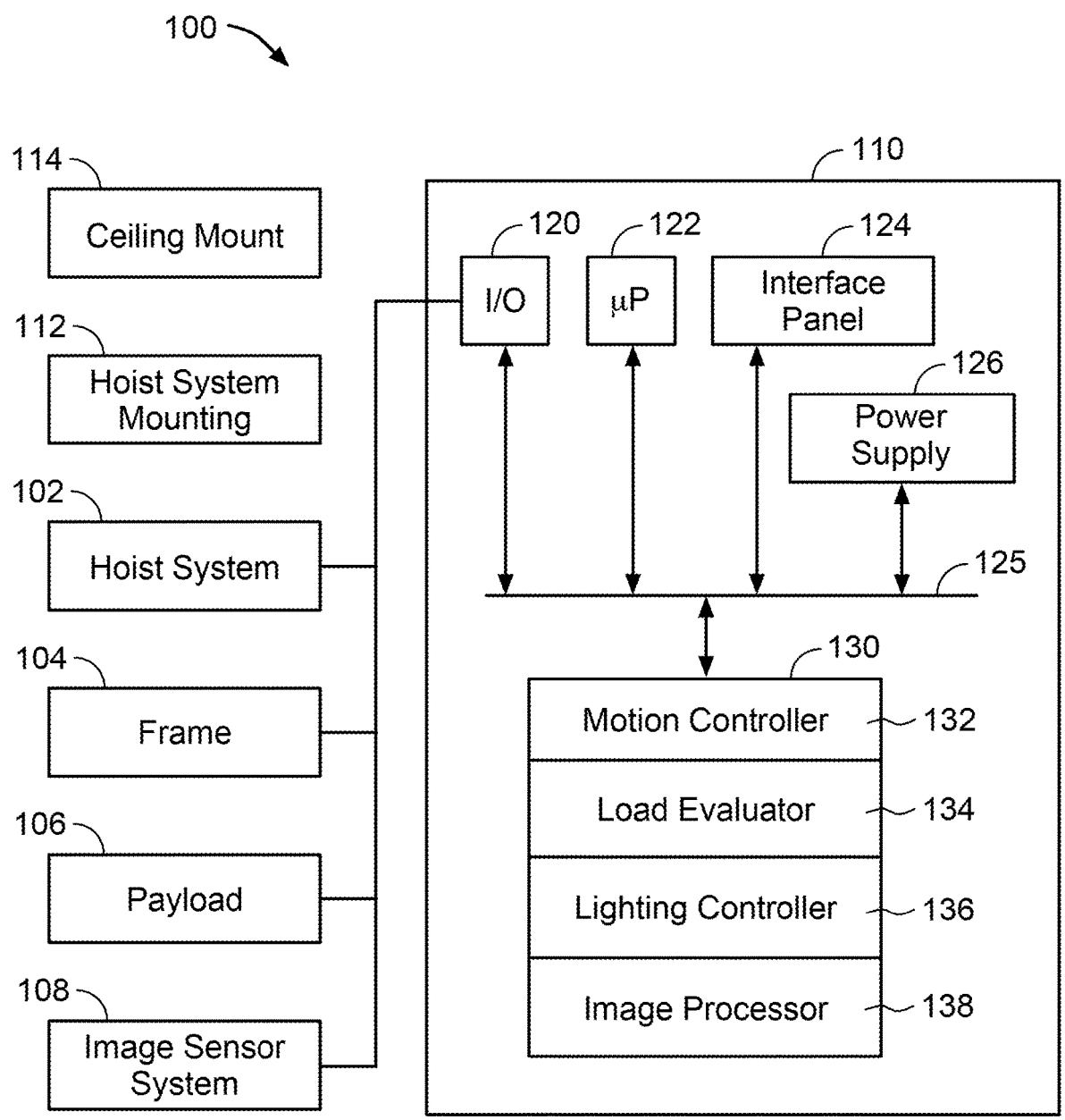
FIG. 1 illustrates a system configured in accordance with an embodiment of the invention.

FIG. 1 illustrates a system 100 configured in accordance with an embodiment of the invention. The system 100 includes a hoist system 102. The hoist system 102 is configured to lift a household object payload to a position adjacent to a ceiling of a room. The household object payload may be a bed container, a wardrobe container or a storage container. Regardless of the payload configuration, the hoist system 102 removes the payload from the floor space of the room when the payload is not in use.

A frame 104 may be a standalone structure or be incorporated into the hoist system 102. The frame 104 includes integrated lighting and payload alignment guides, as demonstrated below. The system 100 also includes a payload 106, which may be modular and interchangeable payloads of the type described above. The system 100 also includes image sensor systems 108. The image sensor systems 108 collect image data from within the payload and the room. In one embodiment, visual data and payload depth data are collected from a payload and ambient depth data is collected within the room.

The hoist system 102, frame 104, payload 106 and image sensor system 108 are electronically connected to a controller 110, which coordinates various operations disclosed herein.

The hoist system 102 is attached to a hoist system mounting 112, which in turn is attached to a ceiling mount 114. Exemplary configurations for these components are disclosed below.

The controller 110 includes input/output ports 120, which may be wired or wireless interfaces to elements 102-108 and to external computer networks (not shown). The controller 110 also includes a microprocessor 122 and an interface panel 124 linked by a bus 125. A power supply 126 is also connected to the bus 125. The power supply 126 manages power for the controller 110 and elements 102-108. A memory 130 is also connected to the bus 125. The memory 130 stores instructions executed by microprocessor 122 to implement operations disclosed herein. In one embodiment, the memory 130 stores a motion controller to modulate the motion provided by hoist system 112. The memory 130 also stores a load evaluator 134, which prevents motion of the hoist system 102 when the payload 106 is overloaded. A lighting controller 136 produces various lighting signals emitted from the hoist system 102 and/or frame 104, such as payload moving signals, safety alert signals and sensor occlusion alert signals. An image processor 138 processes images from the image sensor system 108. The image processor 138 ensures that the hoist system 102 is safely operated in the presence of objects near the payload. The image processor 138 also maintains an inventory of payload objects, which may be communicated to the interface panel 124 or to the input/output ports 120 for delivery to a networked device, such as a computer or smartphone (not shown).

Figure 2:
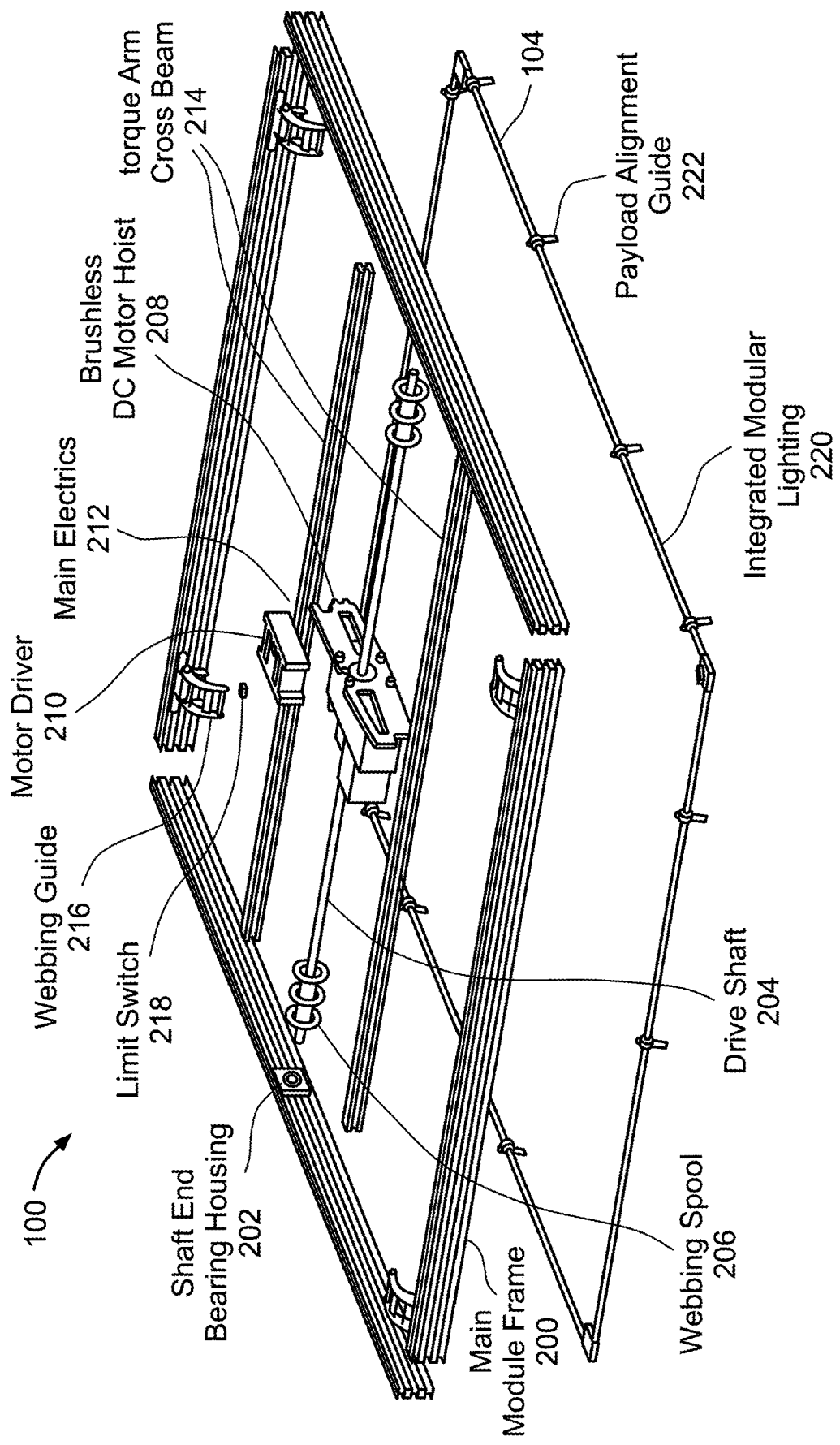
FIG. 2 illustrates an exploded view of a hoist system configured in accordance with an embodiment of the invention.

FIG. 2 is an exploded, top perspective view of an embodiment of the hoist system 102 and a frame 104. The hoist system 102 includes a main module frame 200 that hosts a shaft end bearing housing 202. The shaft end bearing housing 202 receives a drive shaft 204, which supports webbing spools 206. The drive shaft 204 is rotated by a direct current motor hoist 208, which has an associated motor drive 210 and electronics 212. The frame 200 also supports torque arm cross beams 214. Each webbing spool 206 has an associated webbing guide 216 and limit switch 218. The frame 104 is attached to the main module frame 200. The frame 104 includes integrated modular lighting 220 and payload alignment guides 222. In one embodiment, the integrated modular lighting 220 is in the form of Light Emitting Diodes (LEDs) evenly distributed around frame 104.

Figure 3:
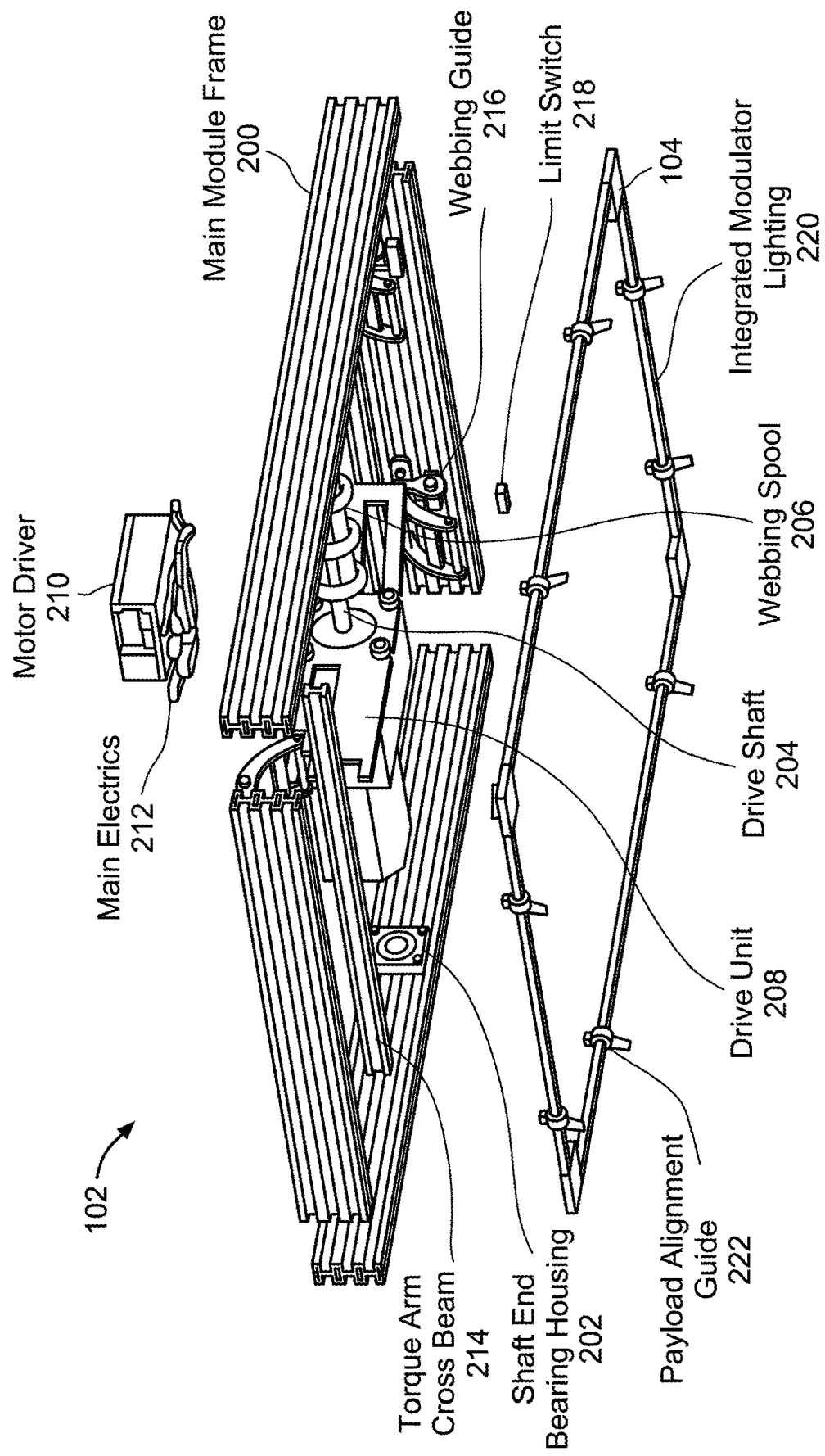
FIG. 3 is another view of the hoist system of FIG. 2.

FIG. 3 is an exploded, bottom perspective view of an embodiment of the hoist system 102 and frame 104. The figure depicts the same components as shown in FIG. 2. The figure more clearly depicts the nature of the payload alignment guide 222, which is an angular surface to engage and then guide the payload 106 into contact with frame 104.

Figure 4:
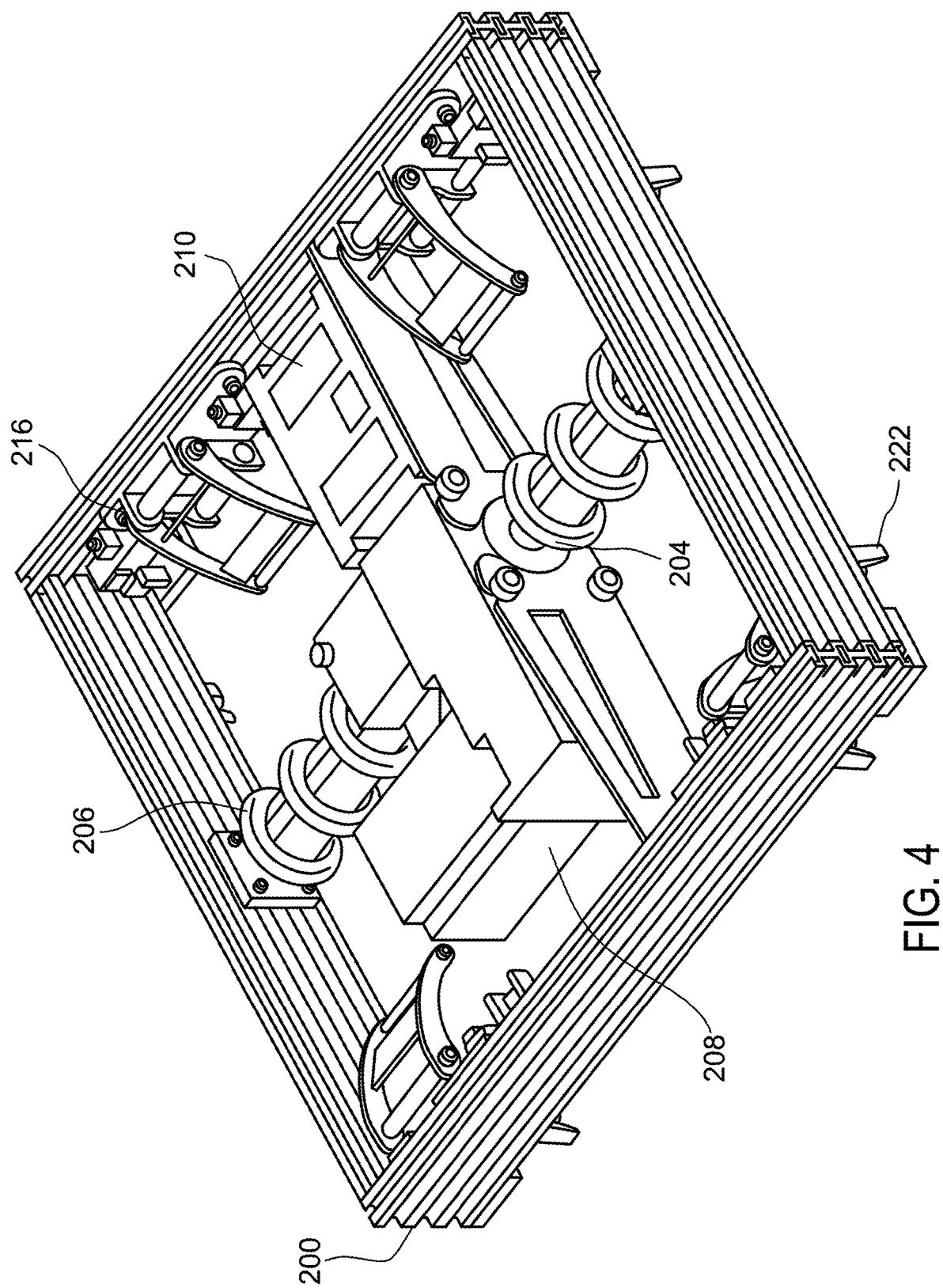
FIG. 4 illustrates a constructed version of a hoist system with different physical dimensions.

FIG. 4 is a top perspective view of an embodiment of the constructed hoist system 102. The figure illustrates main module frame 200, hosting drive shaft 204, which supports four webbing spools 206. The drive shaft 204 is rotated by motor hoist 208, which has associated motor driver 210. The main module frame 200 also supports four webbing guides 216. Thus, four webbing spools 206 control a single payload driven by a single motor 208, which utilizes a single drive shaft 204.

Figure 5:
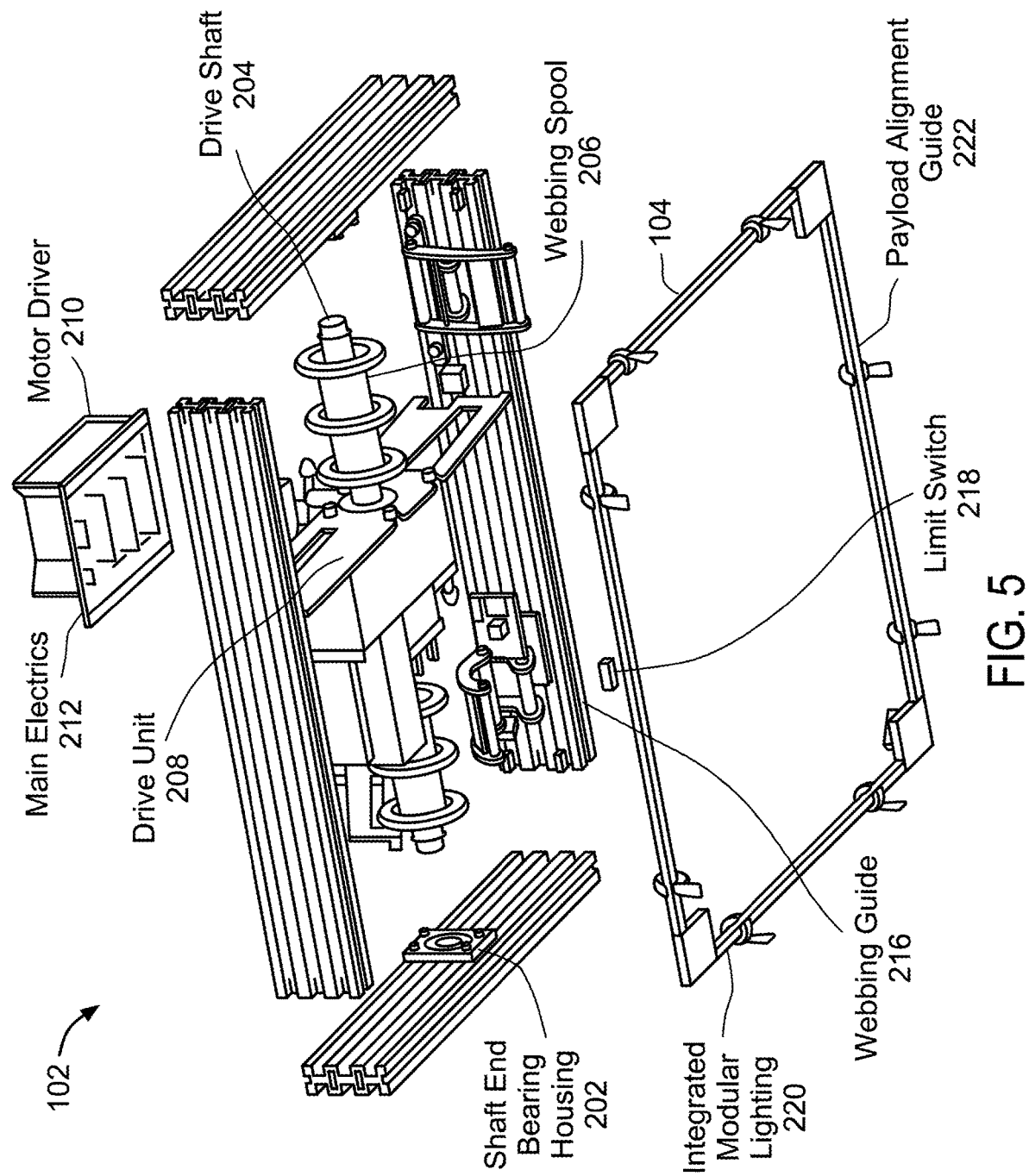
FIG. 5 is an exploded view of the hoist system of FIG. 4.

FIG. 5 is an exploded, bottom perspective view of an embodiment of the hoist system 102 and frame 104. The hoist system 102 and frame 104 typically have the same components, but the physical dimensions are altered based upon the configuration of the payload.

FIG. 6 illustrates the main module frame 200 supporting the drive shaft 204, which includes a torsion spring 600, which may be used to assist the motor hoist 208. In one embodiment, the torsion spring 600 is spooled to have constant torque on the drive shaft 204.

FIG. 7 illustrates webbing guide 216. A tensioning pin 700 supports a low friction bushing 702. A tension arm 704 is positioned between arms 705A and 705B. A bracket 706 is used for attachment to the main module frame 200. A webbing guide 708 has an integrated load cell 710. The webbing guide 708 is a bearing whose position is monitored by an electronic integrated load cell 710. The integrated load cell 710 supplies a warning signal when the payload is overloaded. The integrated load cell 710 senses user intent to move the payload 106 up or down based on applied pressure.

Figure 10:
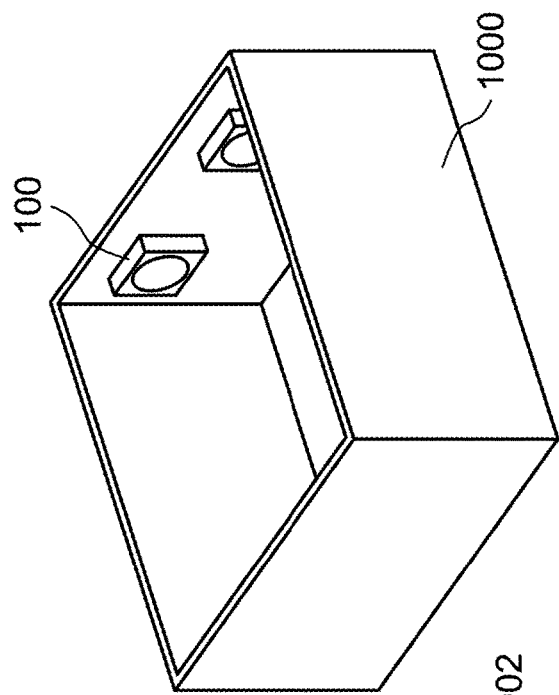
FIG. 10 illustrates a storage container payload.
Figure 8:
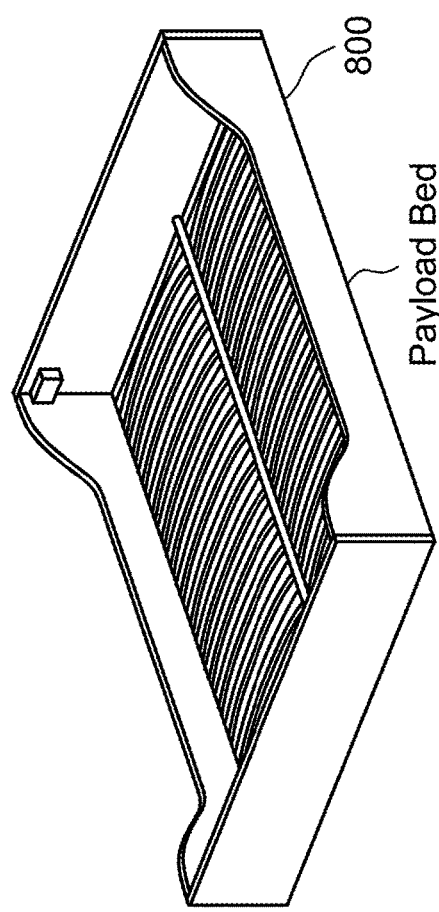
FIG. 8 illustrates a bed container payload.
Figure 9:
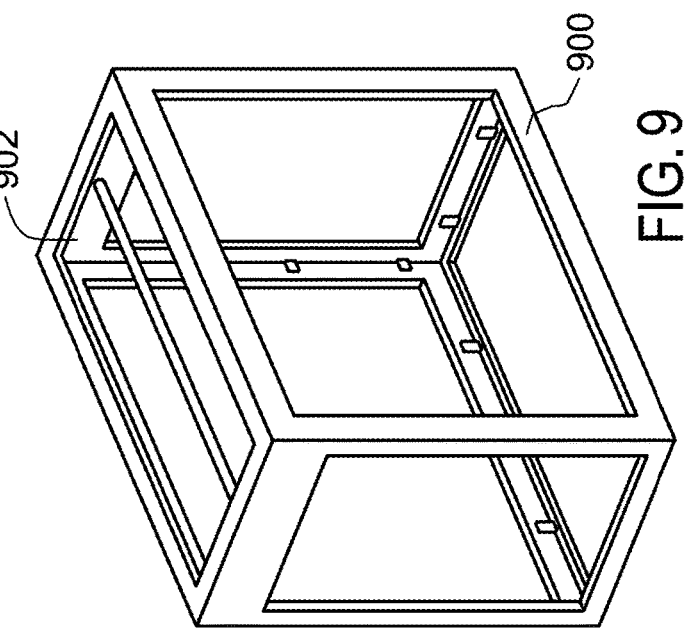
FIG. 9 illustrates a wardrobe container payload.

FIG. 8 illustrates a bed container payload 800. FIG. 9 illustrates a wardrobe container payload 900, which includes an image sensor 906 to collect image data (visual data and payload depth data) within the payload. The image processor 138 processes the image data to maintain an inventory of objects within the wardrobe container payload 900. FIG. 10 illustrates a storage container 1000 with an image sensor 1002 to collect image data (visual data and payload depth data) within the payload. The image processor 138 processes the image data to maintain an inventory of objects within the storage container 1000.

Figure 11:
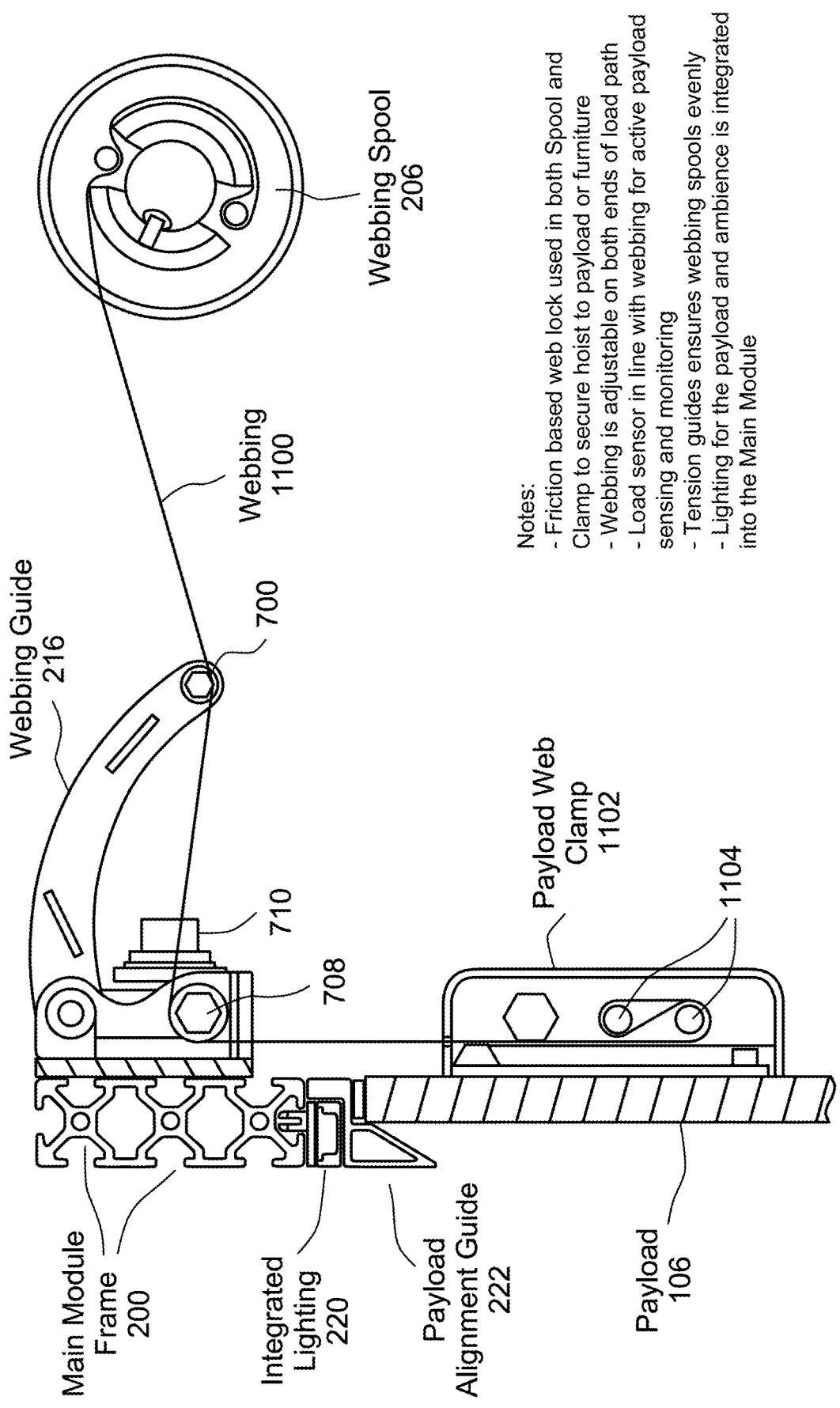
FIG. 11 illustrates webbing, a webbing spool, a webbing guide and a payload web clamp utilized in accordance with an embodiment of the invention.

FIG. 11 illustrates webbing spool 206 hosting webbing 1100. In one embodiment, the webbing 1100 is made of polyester with a tensile strength sufficient to support between 1,000 and 10,000 N. The figure also illustrates tensioning pin 700 on webbing guide 216. The figure also shows webbing guide 708 and integrated load cell 710. The webbing guide 216 is attached to main module frame 200, which hosts integrated lighting 220 and payload alignment guide 222. The figure also illustrates a payload 106 with a payload web clamp 1102, which includes webbing pins 1104. The webbing 1100 is adjustable on both ends of the load path. The integrated load cell 710 is in line with the webbing 1100 for active payload monitoring.

FIG. 12 illustrates a ceiling 1200 and a ceiling mount 114 comprising a ceiling rail bracket 1202 and ceiling rail bracket mounting hardware 1204. The hoist system mounting 112 includes ceiling rail mounting hardware 1206 within a ceiling rail 1208, which has a ceiling rail hard stop 1210. The ceiling rail 1208 slides onto ceiling rail bracket 1202. Main module mounting hardware 1212 is affixed to the ceiling rail 1208. The figure also illustrates the main module frame 200, integrated lighting 220, payload alignment guide 222 and payload 106.

Figures 13, 14:
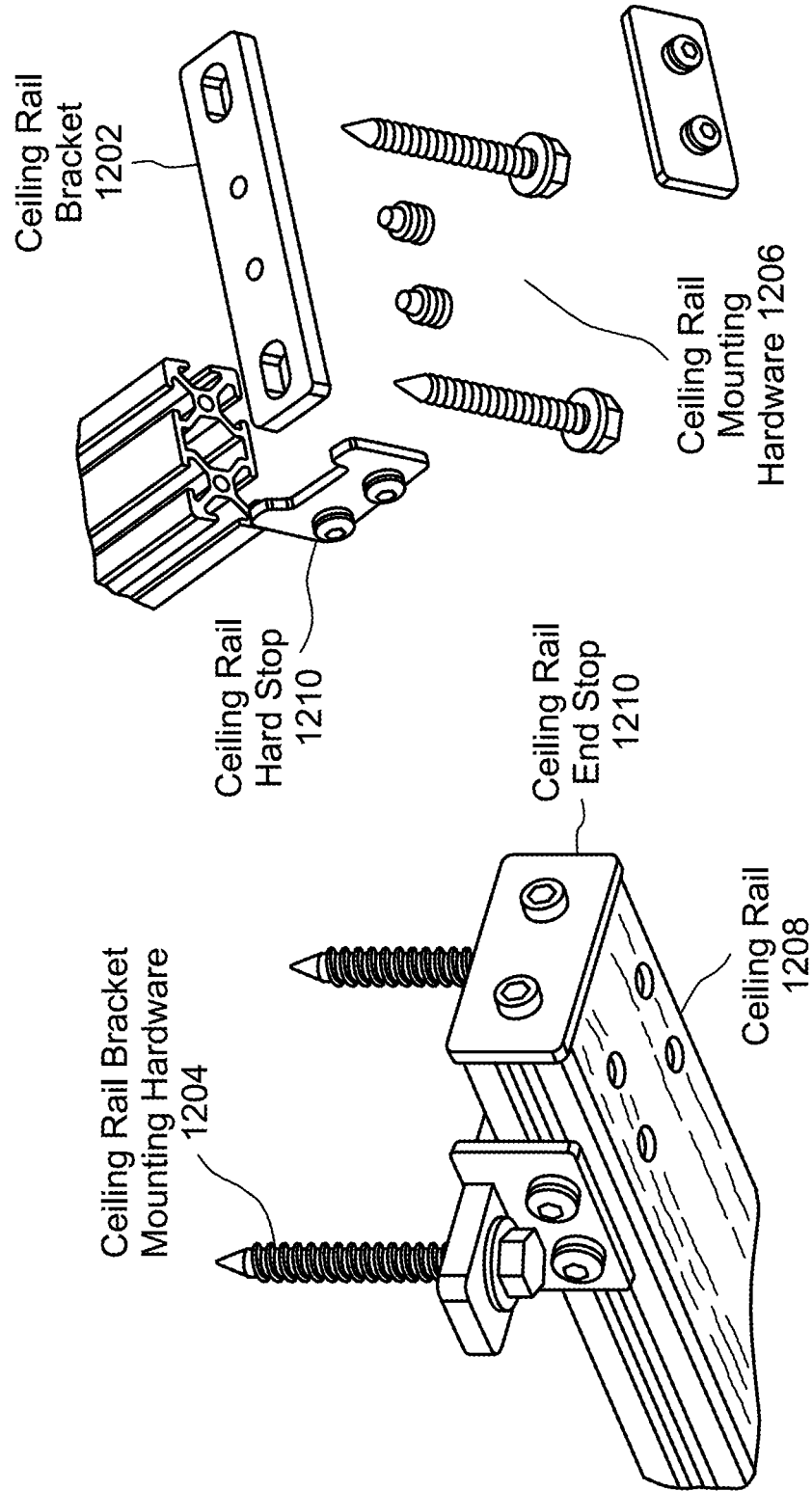
FIGS. 13 and 14 illustrate ceiling mount details associated with an embodiment of the invention.

FIG. 13 is a perspective view of the ceiling rail bracket mounting hardware 1204, ceiling rail 1208 and ceiling rail end stop 1210. FIG. 14 is an exploded view of the ceiling rail bracket 1202, ceiling rail mounting hardware 1206 and ceiling rail hard stop 1210.

FIG. 15 illustrates an instance of an image sensor system 108. In this embodiment, a camera mounting plate 1500 hosts an RGB camera 1502 and a depth camera 1504. The mounting plate 1500 is attached to a motor mounting bracket 1506, which has an associated computer board 1508. Dual cameras may be used to capture different frame rates and resolutions. The image sensor system 108 may be positioned to investigate wardrobe container payload 900 and storage container 1000.

FIG. 16 illustrates another instance of an image sensor system 108. In this embodiment, a first depth sensor 1600 and a second depth sensor 1602 are attached to a housing 1604, which encloses a circuit board. The depth sensors may be laser based, radar based, or Lidar based. They are operative to produce depth data that is processed by the image processor 138. The image processor 138 checks for objects in the path of the moving payload 106. The image sensor system 108 may be mounted in the ceiling or high on the wall adjoining the ceiling. The image sensor system 108 may also be mounted in a room instead of adjacent to a payload, but privacy concerns may dictate that only depth sensors be used to collect information within the room.

In one embodiment, the image processor 138 generates a three-dimensional mesh representing a danger volume visible to a sensor. A danger volume is a zone in physical space that is matched to depth sensor views. A danger volume cannot be occupied by people or objects when the payload is moving. If an object is in a danger volume, the image processor 138 signals the motion controller 132, which halts movement of the hoist system 102.

The lighting controller 136 illuminates the integrated lighting 220 to provide ambient light within a room Alternately, or in addition, the lighting controller 136 illuminates the integrated lighting 220 to produce payload moving signals, for example in the form of flashing LEDs. The lighting controller 136 may also produce safety alert signals, for example illuminating an object in the path of the payload. The lighting controller 136 may also produce a sensor occlusion alert signal, which may be a designated group of LEDs. Such signals may also be displayed on the interface panel 124.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising:
   a hoist system to lift a payload to a position in a room;
   image sensor systems to collect ambient depth data within the room; and
   a controller connected to the hoist system and the image sensor systems, the controller configured to control motion of the hoist system, wherein the motion of the hoist system is controlled in part by the ambient depth data within the room.

2. The system of claim 1 wherein the hoist system comprises: a hoist frame supporting webbing guides;
   a shaft within the hoist frame supporting webbing spools; and
   a motor to drive the shaft, wherein the controller operates the motor to control the motion of the hoist system by controlling webbing movement through the webbing spools and webbing guides.

3. The system of claim 2 wherein the hoist system further comprises a load sensing bearing.

4. The system of claim 2 wherein the hoist system further comprises an image sensor.

5. The system of claim 2 wherein the shaft supports a torsion spring.

6. The system of claim 2 wherein the hoist frame has a torque arm cross beam.

7. The system of claim 1 wherein the hoist system includes an integrated frame with lighting and payload alignment guides.

8. The system of claim 7 wherein the lighting is illuminated by the controller to produce payload moving signals.

9. The system of claim 7 wherein the lighting is illuminated by the controller to produce safety alert signals.

10. The system of claim 7 wherein the lighting is illuminated by the controller to produce sensor occlusion alert signals.

11. The system of claim 1 wherein the image sensor systems include payload image sensors to collect visual data and payload depth data within the payload.

12. The system of claim 11 wherein the controller maintains an inventory of payload objects.

13. The system of claim 1 wherein the image sensor systems include room image sensors to collect the ambient depth data.

14. The system of claim 1 wherein the payload is selected from a bed container, a wardrobe container and a storage container.

15. The system of claim 1 further comprising a ceiling mount affixed to a ceiling.

16. The system of claim 15 further comprising a hoist system mounting connected between the hoist system and the ceiling mount.

17. The system of claim 1 wherein the controller is configured to halt the motion of the hoist system in response to an object proximate to a path of the payload.

18. The system of claim 1 wherein the controller is configured to prevent motion of the hoist system when the payload is overloaded.

* * * * *